(No Model.)
G. ARMSTRONG.
MOLD FOR PIPE COVERING.
No. 557,351. Patented Mar. 31, 1896.
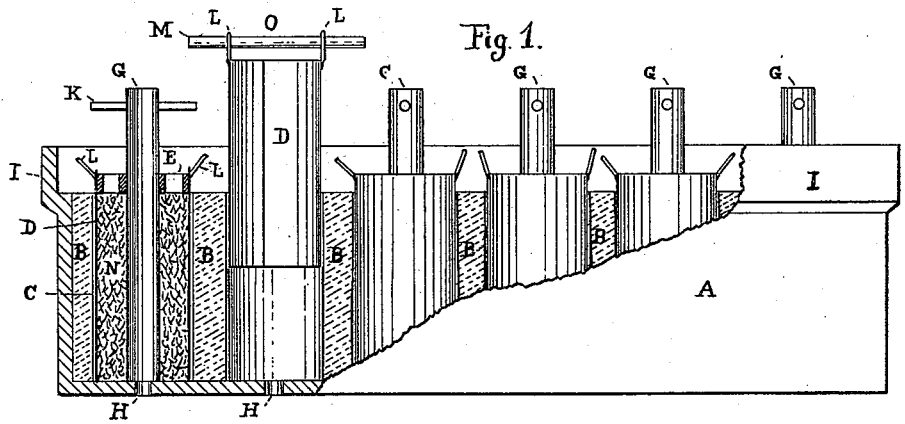
Fig. 1.
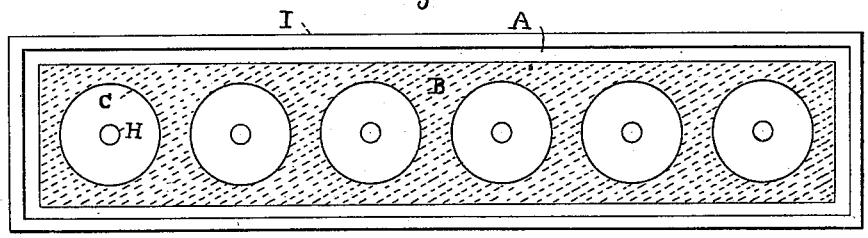
Fig. 2.
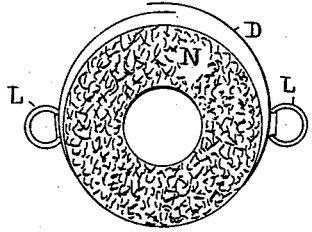
Fig. 3.
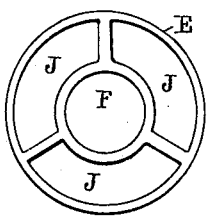
Fig. 4.
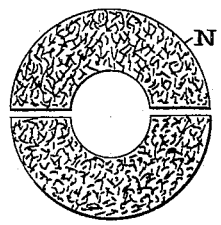
Fig. 5.
Witnesses:
Edw. S. Cobb.
Wilson D. Bent, Jr.
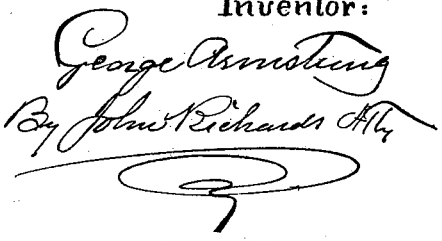
Inventor:
George Armstrong
By John Richards Atty

UNITED STATES PATENT OFFICE.

GEORGE ARMSTRONG, OF SAN FRANCISCO, CALIFORNIA.

MOLD FOR PIPE-COVERING.

SPECIFICATION forming part of Letters Patent No. 557,351, dated March 31, 1896.

Application filed April 16, 1895. Serial No. 545,889. (No model.)

*To all whom it may concern:*

Be it known that I, GEORGE ARMSTRONG, a citizen of the United States, residing in the city and county of San Francisco, State of California, have invented certain new and useful Improvements in Molds for Preparing Pipe-Covering; and I hereby declare the following specification and the drawings therewith to be a complete description of my invention, with the manner of applying the same in practice.

My invention relates to the molding of sectional or detachable pipe-covering of cylindrical contour from plastic material, such material as will flow when mixed with water and then set in molds, so as to be removed and dried.

My improvements consist in providing molds made from sheet metal, set in and supported by a surrounding stratum of some plastic material, such as plaster-of-paris or cement, that gives mechanical support to the walls of the mold so the latter can be made of thin flexible sheets of metal bent to a cylindrical form.

My invention also includes flexible open-sided shells or linings that can be inserted in the molds and expanded to fit closely all around the interior, but are removable with the material when molded, and afterward freed therefrom by being expanded without rubbing or distortion of the substance molded, thus securing smooth and perfect surfaces thereon while the material is soft.

My invention further includes various devices to carry this method of molding plastic material into effect, as will be hereinafter more fully pointed out in the specification, drawings, and claims.

The object of my invention is celerity in the operation of molding pipe-covering by means of a simple and inexpensive apparatus, especially in supporting the material when removed from the mold, to avoid rubbing action, and preserving the surfaces in a smooth and perfect form, the operation being that of supplying the molded forms with a covering shell or envelop that enables its removal from the mold much sooner than is possible if the material had no support but its own adherence and stability, thus requiring a less number of molds.

Referring to the drawings, Figure 1 is a partial longitudinal section showing a small battery or set of molds for forming pipe-covering according to my invention. Fig. 2 is a plan view of Fig. 1 with the core-bars and lining or enveloping tubes removed. Fig. 3 is an end view of a section of pipe-covering with the enveloping shell or tube expanded ready for removal. Fig. 4 is a plan view of the upper guide for the core-bar. Fig. 5 is an end view of a section of the pipe-covering slit open, as it appears when ready to be applied on a pipe.

Similar letters of reference on the different figures indicate corresponding parts throughout.

A is a box or flask containing a filling B of some kind of plastic material, such as plaster-of-paris or cement, in which is embedded a row or rows of parallel tubes C, the latter made of thin non-corrosive metal, open at the top and supported by the surrounding material B.

Around the top of the flask A is formed a ledge or rim I, that projects above the top of the molds and prevents the escape of the material that may overflow in filling the molds. These flasks A can contain any number of the tubes or molds C, as the extent of the operation or manufacture may demand. I have shown but a single row in the drawings, which answers for the purpose of explanation.

When pipe-covering is to be molded, there is inserted in each of the tubes C lining tubes or shells D, open and overlapping at one side, as seen in Fig. 3, so bent or set as to spring outward and closely fit the interior of the mold-tubes C. In the top of these shells D are fitted removable open grid-plates E, having a central bore at F to form a guide and support for the core-bars G, the lower end of these bars fitting in holes at H in the bottom of the flask A to hold these core-bars concentric in the mold, as seen in Fig. 1. When all of the molds or tubes C are thus filled with the interior shells D and the core-pins G are set in place, the molds are poured full through the apertures J in the grid-plates E, any of the material overflowing being retained by the ledge or rim I.

When the material sets or partially hardens, the core-bars G are withdrawn by means of cross-pins K, the lug-rings L, attached to the top of the shells D, are set vertical, a bar M is inserted, and these shells D, with the contained molded form N, are withdrawn, as seen at O, Fig. 1.

The shells D are made of zinc or other non-corrosive metal, and being thin at first adhere to and protect the forms N, but by slight concussion spring open, as seen in Fig. 3, and are removed without rubbing or disturbing the surfaces, leaving the molded forms N in a perfect state, rigid enough to be removed to a drying-room, where they become rigid, and are finished ready to be slit in two, as seen in Fig. 5, and applied on pipes.

The material employed is preferably gypsum, asbestos, and silica, compounded, as set forth in a separate application for Letters Patent filed conjointly with this petition and specification on a heat non-conducting compound; but my process and apparatus for molding pipe-covering are applicable to any like material that can be prepared in a liquid or plastic state, and will set or harden in the molds. In this manner it will be seen that the original molds or matrices C are made at small expense, rigidly supported, and that in treatment the forms are preserved from rubbing action, supported mechanically until hardened, and can be both removed and handled as soon as the material sets or becomes slightly hardened in the molds.

Having thus explained the nature and objects of my invention, what I claim as new, and desire to secure by Letters Patent, is—

1. In apparatus for molding pipe-covering, a flask or vessel containing cylindrical tubes or molds set rigidly and permanently therein, and embedded in hard plaster or cement, and in these tubes or molds thin flexible linings, expansible to fit the interior of the fixed tubes and removable therefrom when filled with the material to be molded, substantially as described.

2. In apparatus for molding pipe-covering, a bed or flask containing a series of tubes fixed permanently therein, and within these tubes flexible linings projecting above the top of the fixed tubes and removable therefrom after being filled with the pipe-covering material, in the manner substantially as described.

3. In pipe-molding apparatus, a series of fixed tubes or molds permanently embedded in a flask or frame, and in combination therewith removable expansible linings projecting above the top of the permanent molds or tubes, provided with handles, a core-pin, and a centering-guide to hold the pin, all operating in the manner and for the purposes substantially as described.

In testimony whereof I have hereunto affixed my signature in the presence of two witnesses.

GEORGE ARMSTRONG.

Witnesses:
 ALFRED A. ENQUIST,
 WILSON D. BENT, Jr.